Oct. 4, 1938.     G. BROUGHTON     2,132,095
METHOD OF CONDITIONING FIBROUS MATERIAL
Filed Jan. 22, 1937
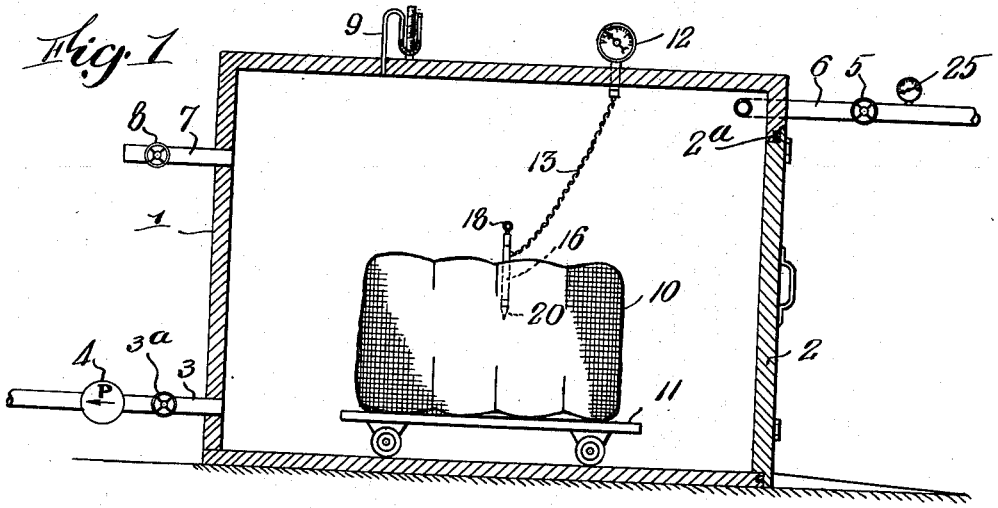
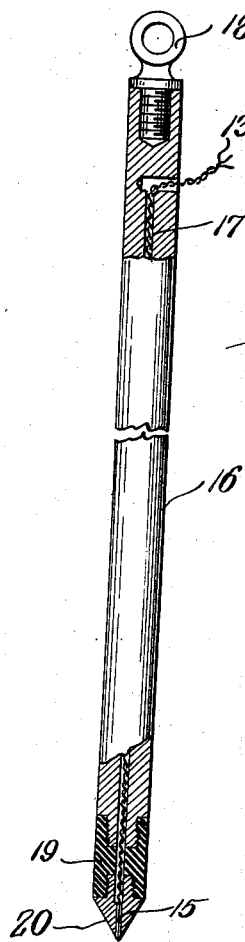
Inventor:
Geoffrey Broughton
By Roberts, Cushman & Woodbury
Attys.

Patented Oct. 4, 1938

2,132,095

UNITED STATES PATENT OFFICE 2,132,095

METHOD OF CONDITIONING FIBROUS MATERIAL

Geoffrey Broughton, Rochdale, England

Application January 22, 1937, Serial No. 121,912

9 Claims. (Cl. 34—24)

This invention relates to an improved method of treating fibrous material, and more particularly cotton, for example, to improve the ginning and/or spinning qualities thereof.

Freshly picked cotton, and especially so-called "first pick" cotton, is not immediately satisfactory for spinning. In fact, heretofore spinning of the "first pick" cotton was generally avoided until it had been aged for a considerable period of time, e. g., a period of six months or more. As the cotton is aged, its moisture content is reduced and the moisture thus removed is not later regained. Apparently this unstable, irreversible moisture which is included particularly in the fresh "first pick" cotton is due to factors occurring during the growth of the cotton. When the cotton remains longer in the boll before picking, this unstable moisture content is gradually reduced due to evaporation in the sunlight and air, so that the later picked cotton has substantially better spinning qualities even without undergoing a period of aging in the bale.

The present invention provides a method of artificial aging, whereby a substantial fraction of the total moisture content of the cotton may be removed within a few hours, for example, either before ginning or after the cotton has been baled. Thereafter the cotton can be uniformly conditioned, either by exposure to atmospheric air or by controllably introducing moisture. Preferably this method may be practiced by the employment of a fairly high vacuum; for example, the cotton may be removed from the atmospheric air and subjected to a low pressure of less than 50 mm. absolute (of mercury), or preferably to a pressure below 20 mm. absolute. The cotton is maintained at this low pressure until the greater part of its moisture is evaporated off. This occurs quite rapidly at the low pressures named. Thereupon the normal moisture content may be regained either, for example, by exposure of the cotton to steam or to air of controlled moisture content.

Such a method may also be advantageously employed to reduce the static electrical charges on the cotton fibers, since the conductivity of air at low pressures is substantially greater than that of atmospheric air. Accordingly the leakage of the static charge from the fibers into the air is greatly increased at reduced pressures and the fibers of cotton are thereafter more readily handled during the drafting and spinning operations, while ginning may also be more readily accomplished if the cotton has been treated in this manner.

When cotton in the bale is being treated, the low pressure may be contained while the temperature of the central part of the bale is being observed, the low pressure being maintained while the temperature falls due to evaporation of moisture. When the temperature of the bale has reached its minimum point, however, and starts to rise, it may be concluded that the rate of evaporation has decreased substantially. Accordingly, after this condition has been attained, the period of low pressure may be terminated and the cotton is ready to regain its normal moisture content, i. e., the moisture content that would be possessed by the cotton under similar conditions of air humidity, if it had been completely aged so that it had lost its unstable, irreversible moisture content. In order to save time and storage space and to aid the uniform conditioning of the cotton, steam may be controllably admitted to the closed chamber containing the bale in order to permit the regaining of normal moisture.

The same general principles may also be followed before a spinning or drafting operation in order to reduce the static charges on the cotton fibers, thus permitting more satisfactory spinning conditions and the employment of a higher draft.

In the accompanying drawing:

Fig. 1 is a diagrammatic view of apparatus which may be employed in accordance with this invention if a bale of cotton is to be treated; and Fig. 2 is a broken elevational view, with parts shown in section, illustrating a device which may be employed in observing the temperature of the central portion of the cotton bale as it is being subjected to a relatively high vacuum.

In accordance with this invention, cotton which has an unstable, irreversible moisture content, e. g., freshly picked cotton, and particularly "first pick" cotton, may be treated to produce artificial aging, i. e., to remove the unstable, irreversible, moisture content, or cotton may be treated either before or after ginning to reduce the static charges on the fibers, so that the cotton may be more readily handled either during ginning, drafting or spinning, as the case may be.

Figs. 1 and 2 illustrate apparatus which may be conveniently employed in the practice of this invention when baled cotton is to be treated. Thus, for example, this apparatus is particularly useful in the artificial aging of baled "first pick" cotton. The apparatus may comprise a closed chamber or housing 1 provided with a door 2 affording a gasket 2a, the door being arranged so that it may be closed firmly to compress the gasket to afford an air-tight seal and the entire chamber under such conditions being substantially hermetically sealed. The chamber is connected by an air outlet pipe 3 to a suitable vacuum pump 4 which may be effective in reducing the pressure within the chamber to below 50 mm. absolute and preferably to a pressure below 20 mm. absolute. Pipe 3 may be provided with a control valve 3a. A steam pipe 6 may be connected to the chamber and may be provided with a control valve 5 and with a suitable gauge 25 to indicate the quantity of steam supplied to housing 1 when the valve 5 is opened. An air inlet pipe 7 having a control valve 8 may also communicate with the interior of the housing, the outer end of this pipe 7 opening into the exterior atmosphere. A suitable pressure gauge such as a closed-end manometer 9 may also be mounted on the chamber 1.

The door 2 may be opened and an unopened bale 10 of cotton may be moved into the chamber as, for example, on a suitable truck 11. The door is closed and firmly clamped in place, the valves 5 and 8 being closed, and the pump 4 is then started to exhaust the air from the interior of the chamber 1 until the desired low pressure is reached. This pressure should be below 50 mm. (of mercury), and preferably below 20 mm. The cotton may be maintained under this low pressure until the major portion of the entire moisture content of the bale is removed.

Evaporation of the moisture content may be effected with especial facility when the pressure in the housing is of the order of the vapor pressure of water at the prevailing temperature or below such a vapor pressure.

In order, however, more accurately to determine the conditions prevailing at the central portion of the bale, I prefer to employ a temperature indicating device of the type shown in Figs. 1 and 2. This device may comprise a suitable electrical indicator 12 disposed on the exterior of the housing and connected by flexible leads 13 to a suitable thermocouple or preferably a thermopile 15 which is located in the end of a rather large bar 16. This bar may be provided with a central bore 17 through which the leads 13 extend to the pointed end 20 of the bar in which the thermopile is located. This pointed end may conveniently be insulated from the body portion of the bar by an insulating member 19 to which the body portion of the bar and the pointed end 20 thereof are secured by suitable screw-threaded connections. The upper end of the bar preferably may be provided with a metal ring 18.

When a device of this character is employed, the pointed end of the bar may be driven into the bale until it is in the central portion thereof, the flexible leads 13 extending from the exposed upper end of the bar to the exterior electrically controlled temperature indicator 12. Thus changes in the temperature of the central portion of the bale can conveniently be observed from the exterior of the housing 1.

As moisture is evaporated from the baled cotton at the reduced pressure to which the cotton is being subjected, the temperature of the cotton gradually falls, the temperature of the central portion of the bale tending to reach a minimum point when the rate of evaporation in this part of the bale is near its maximum. Thereafter, as the amount of moisture remaining in this part of the bale becomes substantially less, heat leaks inwardly through the walls of the housing 1, through the attenuated atmosphere within the housing and through the cotton in the outer part of the bale, causing an ultimate increase in temperature of the center of the bale which affords an indication that the major portion of the moisture content of the cotton has been removed.

Thereupon valve 3a in the pipe 3 may be closed and moisture may be introduced into the cotton in any suitable manner. For example, with apparatus of the character shown in Fig. 1, a measured quantity of steam may be admitted through the pipe 6, it being evident that the steam remains volatile at the low pressure of the chamber so that the moisture is readily taken up by the cotton. After the desired quantity of steam has thus been admitted, the valve 8 may be opened so that atmospheric air flows into the chamber 1. After atmospheric pressure has been reached in the chamber, the door 2 may be opened, the bar 16 may be drawn from the bale by means of the ring 18, and the bale may be taken out of the chamber. Thereafter, while the bale is exposed in the air, the normal moisture content of the bale under the given humidity conditions will be attained, but the unstable irreversible moisture content is not regained. The cotton therefore is in the condition which might ultimately be reached after a long period of aging, although the present method assures greater uniformity of moisture content throughout the bale than often is obtained when natural aging is employed. Furthermore, the controlled conditioning of the cotton permitted by the present invention permits successive bales to be treated uniformly so that the cotton from each bale may be in practically the same condition for spinning.

It is to be understood that the moisture regained may be effected in various ways which are generally subject to accurate control. Not only may steam first be admitted to the chamber while the pressure remains near the low point, as has been described, but some air may be admitted through the valve 8 at the same time that the steam is being introduced into the chamber, and thereafter atmospheric air may be introduced to bring the pressure within the chamber up to atmosphere pressure. If desired, however, water may be admitted to the housing, with or without air, or substantially saturated air may be admitted. Storing of the cotton in atmospheric air may be depended upon, if desired, eventually to return the normal moisture content to the cotton.

It is evident that the aging of freshly picked cotton in this manner avoids the fire dangers which are inherent when the cotton bales are opened up to accelerate aging, although obviously the same general method of procedure may be followed in conditioning cotton from opened bales. This method also avoids the undesirable factors which would result if high temperatures were employed to dry the cotton, thereby tending to cause deterioration in the quality of the cotton.

The same general method of treatment may be employed for seed cotton before ginning, not only to remove the unstable moisture from the cotton, but also to reduce the static charges on the fibers, thereby facilitating the ginning operation. Under such conditions, since the cotton is not baled, the moisture may be more rapidly evaporated from the cotton and the electrical charges readily leak out into the air at the low subatmospheric pressure, i. e., a pressure below 50 mm.

(of mercury) and preferably below 20 mm. absolute.

The same general type of apparatus as shown in Fig. 1 can also be employed for treating cotton rovings, or waste cotton which is to be reprocessed. Under such conditions the cotton may be subjected to low pressures of the order named for an hour or more so that the static charges on the fibers are reduced and the cotton may be more readily drafted or spun. The rovings may conveniently be moved into the chamber when wound on bobbins carried on suitable racks, while the waste cotton and unginned cotton may be moved into the housing in any suitable open box-like container, preferably covered with a fine wire screening.

It is evident that the present invention affords a simple, convenient and inexpensive method of treating cotton and that this method is particularly advantageous in artificially and uniformly aging freshly picked cotton, and more especially "first pick" cotton. Such a method of aging the cotton does not require a large storage space, may be effected during a relatively short period of time, does not involve any increased fire hazard, does not result in deterioration of the quality of the fibers as would be the case were the cotton dried at high temperatures, and does not involve the employment of any noxious chemicals or gases, but merely involves a variation of the pressure of the atmospheric air in which the cotton is located and, if desired, the controlled restoration of the normal moisture content by steam, moist air, or the like.

It furthermore is evident that this same method of treatment may be employed before ginning, either to reduce the static charges on the fibers, thus to facilitate the ginning operation, or for this purpose and also to produce artificial aging, and that the method may also be employed for reducing the static electricity on cotton rovings or cotton waste, thus facilitating drafting and spinning operations.

It should be understood that the present disclosure is for the purpose of illustration only and that this invention includes all modifications and equivalents which fall within the scope of the appended claims.

I claim:

1. Method of treating cotton, comprising subjecting the cotton to a pressure of less than 50 mm. (of mercury) absolute.

2. Method of treating cotton, comprising subjecting the cotton to a pressure of less than 20 mm. (of mercury) absolute.

3. Method of treating first pick cotton comprising placing the cotton in a chamber containing air at atmospheric pressure, maintaining the chamber sealed against inward leakage of any gaseous medium, while exhausting air and moisture from the chamber to bring the pressure of the air within the chamber to less than 20 mm. (of mercury) absolute, and maintaining such a low pressure until a substantial portion of the moisture content of the cotton has evaporated, and thereupon unsealing the chamber to admit atmospheric air to return the pressure within the chamber to atmospheric pressure.

4. Method of artificially aging and conditioning first pick cotton by removing its unstable, irreversible moisture content, comprising subjecting the cotton to a pressure of less than 50 mm. (of mercury) absolute and maintaining the cotton under such a pressure until a substantial fraction of its moisture content has been removed, then controllably introducing moisture into the cotton to accelerate the return of is normal moisture content.

5. Method of artificially aging and conditioning first pick cotton by removing its unstable moisture content, comprising subjecting the cotton to a pressure of below 20 mm. (of mercury) absolute, and maintaining the cotton under such a low pressure until its temperature has reached a minimum point and has started to rise, thereby affording an indication of evaporation of a substantial portion of the entire moisture content, and thereafter causing the cotton to regain its normal moisture content.

6. Method of artificially aging and conditioning first pick cotton in the bale, comprising subjecting the bale to a pressure below 20 mm. (of mercury) absolute, and maintaining the cotton under such a low pressure until the temperature of the inner portion of the bale has reached a minimum point due to evaporation and has started to rise, whereby the unstable, irreversible moisture content of the cotton is removed.

7. Method of conditioning and reducing the static electricity on a cotton roving before a drafting or spinning operation, comprising subjecting the roving to a pressure of less than 50 mm. (of mercury).

8. Method of conditioning and reducing the static electricity on cotton waste, comprising subjecting the waste to a pressure of less than 50 mm. (of mercury).

9. Method of artificially aging and conditioning seed cotton comprising subjecting the seed cotton to a pressure below 20 mm. (of mercury) absolute.

GEOFFREY BROUGHTON.